US011288295B2

(12) United States Patent
Fan et al.

(10) Patent No.: US 11,288,295 B2
(45) Date of Patent: \*Mar. 29, 2022

(54) UTILIZING WORD EMBEDDINGS FOR TERM MATCHING IN QUESTION ANSWERING SYSTEMS

(71) Applicant: Green Market Square Limited, Road Town (VG)

(72) Inventors: James J. Fan, Mountain Lakes, NJ (US); Chang Wang, White Plains, NY (US); Bing Xiang, Mount Kisco, NY (US); Bowen Zhou, Somers, NY (US)

(73) Assignee: Green Market Square Limited

( \* ) Notice: Subject to any disclaimer, the term of this patent is extended or adjusted under 35 U.S.C. 154(b) by 78 days.

This patent is subject to a terminal disclaimer.

(21) Appl. No.: 16/546,770

(22) Filed: Aug. 21, 2019

(65) Prior Publication Data

US 2019/0377747 A1  Dec. 12, 2019

Related U.S. Application Data

(63) Continuation of application No. 15/181,931, filed on Jun. 14, 2016, now Pat. No. 10,467,270, which is a
(Continued)

(51) Int. Cl.
*G06N 20/00* (2019.01)
*G06N 3/08* (2006.01)
(Continued)

(52) U.S. Cl.
CPC .... *G06F 16/3344* (2019.01); *G06F 16/24578* (2019.01); *G06F 16/313* (2019.01);
(Continued)

(58) Field of Classification Search
CPC ..... G06F 16/3344; G06N 20/00; G06N 7/005
See application file for complete search history.

(56) References Cited

U.S. PATENT DOCUMENTS 6,533,131 B2  3/2003  Bada
6,553,131 B1  4/2003  Neubauer
(Continued)

OTHER PUBLICATIONS

"Method of Computing Relevancy Score in a Question and Answering System", An IP.com Prior Art Database Technical Disclosure, IP.com No. 000222407, IP.com Electronic Publication: Oct. 2, 2012, pp. 1-3.
(Continued)

*Primary Examiner* — Kevin W Figueroa
(74) *Attorney, Agent, or Firm* — Van Pelt, Yi & James LLP

(57) ABSTRACT

Software that generates an answer to an input question using a source document by performing the following operations: (i) receiving a question; (ii) generating a plurality of vectors including a first vector representation of a term in the question and a second vector representation of a term in a source document; (iii) providing each dimension of each of the first vector representation and the second vector representation into a respective input node of an artificial neural network; (iv) determining whether the source document is relevant to answering the question based, at least in part, on an output generated by the artificial neural network; and (v) in response to determining that the source document is relevant, generating an answer to the question utilizing the source document.

21 Claims, 5 Drawing Sheets

Related U.S. Application Data continuation of application No. 14/727,961, filed on Jun. 2, 2015, now Pat. No. 10,467,268.

(51) Int. Cl.
| | | |
|---|---|---|
| *G06N 3/04* | (2006.01) | |
| *G06F 16/33* | (2019.01) | |
| *G06F 16/31* | (2019.01) | |
| *G06F 16/2457* | (2019.01) | |
| *G06F 16/332* | (2019.01) | |
| *G06F 40/30* | (2020.01) | |
| *G06N 7/00* | (2006.01) | |

(52) U.S. Cl.
CPC .......... *G06F 16/3329* (2019.01); *G06F 40/30* (2020.01); *G06N 3/04* (2013.01); *G06N 3/084* (2013.01); *G06N 7/005* (2013.01); *G06N 20/00* (2019.01)

(56) References Cited

U.S. PATENT DOCUMENTS

| | | | |
|---|---|---|---|
| 8,538,955 B2 | 9/2013 | Hu | |
| 2005/0143971 A1* | 6/2005 | Burstein | G06F 40/253 |
| | | | 704/4 |
| 2006/0235689 A1* | 10/2006 | Sugihara | G10L 15/1822 |
| | | | 704/257 |
| 2010/0063797 A1 | 3/2010 | Cong | |
| 2010/0063948 A1 | 3/2010 | Hemant | |
| 2011/0270604 A1* | 11/2011 | Qi | G06F 16/3344 |
| | | | 704/9 |
| 2012/0078636 A1 | 3/2012 | Ferrucci | |
| 2014/0156567 A1 | 6/2014 | Scholtes | |
| 2014/0163962 A1 | 6/2014 | Castelli | |
| 2014/0172880 A1 | 6/2014 | Clark | |
| 2014/0172883 A1 | 6/2014 | Clark | |
| 2014/0236578 A1 | 8/2014 | Malon | |
| 2015/0095017 A1* | 4/2015 | Mnih | G06F 40/242 |
| | | | 704/9 |
| 2016/0357855 A1 | 12/2016 | Fan | |
| 2016/0358094 A1 | 12/2016 | Fan | |

OTHER PUBLICATIONS

"Using a cognitive system to assemble multiple answers into a single response", An IP.com Prior Art Database Technical Disclosure, IP.com No. 000238536, IP.com Electronic Publication: Sep. 3, 2014, pp. 1-3.

Ebret, Remi, and Collobert, Ronan, "Word Embeddings Through Hellinger PCA", IDIAP Research Report, Idiap-RR-29-2013, Aug. 2013, arXiv preprint arXiv: 1312.5542 (2013), 7 pages.

Murdock, et al., "Textual evidence gathering and analysis", IBM Journal of Research and Development, vol. 56, No. 3/4 Paper 8, May/Jul. 2012, © Copyright 2012, IBM, pp. 1-14.

Weston et al., "Deep Learning via Semi-supervised Embedding", G. Montavon et al. (Eds ): Neural Network: Tricks of the Trade, 2nd edition, LNCS 7700, 2012, pp. 639-655.

IBM, "List of IBM Patents or Patent Applications Treated as Related", Appendix P, 2 pages, dated Aug. 22, 2019.

\* cited by examiner

UTILIZING WORD EMBEDDINGS FOR TERM MATCHING IN QUESTION ANSWERING SYSTEMS

BACKGROUND

The present invention relates generally to the field of natural language processing, and more particularly to term matching in question answering systems.

Natural language processing (NLP) is a field of computer science, artificial intelligence, and linguistics that, amongst other things, is concerned with using computers to derive meaning from natural language text. NLP systems may perform many different tasks, including, but not limited to, determining the similarity between certain words and/or phrases. One known way to determine the similarity between words and/or phrases is to compare their respective word embeddings. A word embedding is a mapping of natural language text to a vector of real numbers in a continuous space (and is also sometimes referred to as a "vector representation"). Generally speaking, the word embeddings of similar words are located close to each other in the continuous space.

Question answering (QA) systems are computer systems that use NLP to answer questions posed by humans in natural language. Term matching is a QA process by which QA systems evaluate whether a given corpus (or "passage") is relevant to answering a particular question.

SUMMARY

According to an aspect of the present invention, there is a method, computer program product and/or system that performs the following operations (not necessarily in the following order): (i) receiving, by a question answering (QA) system, an input question asked by a user, wherein the QA system is a computer system configured to answer input questions utilizing a plurality of source documents; (ii) generating, by the QA system, a plurality of vectors including a first vector representation of a term in the input question and a second vector representation of a term in a source document of the plurality of source documents, wherein the first vector representation and the second vector representation are generated by combining respective pluralities of dimensions for the first vector representation and the second vector representation to form multi-dimension vectors; (iii) providing, by the QA system, each dimension of each of the first vector representation and the second vector representation as input into a respective input node of an artificial neural network, wherein the artificial neural network is trained to identify pairs of similar vector dimensions; (iv) determining, by the QA system, whether the source document is relevant to answering the input question based, at least in part, on: an output generated by the artificial neural network based on the provided input, and additional outputs generated by the artificial neural network based on additional inputs, the additional inputs including respective dimensions of respective vector representations for respective input question terms and source document terms corresponding to each possible remaining combination of one input question term and one source document term; and (v) in response to determining that the source document is relevant to answering the input question, generating, by the QA system, an answer to the input question utilizing the source document.

DETAILED DESCRIPTION

Figure 1:
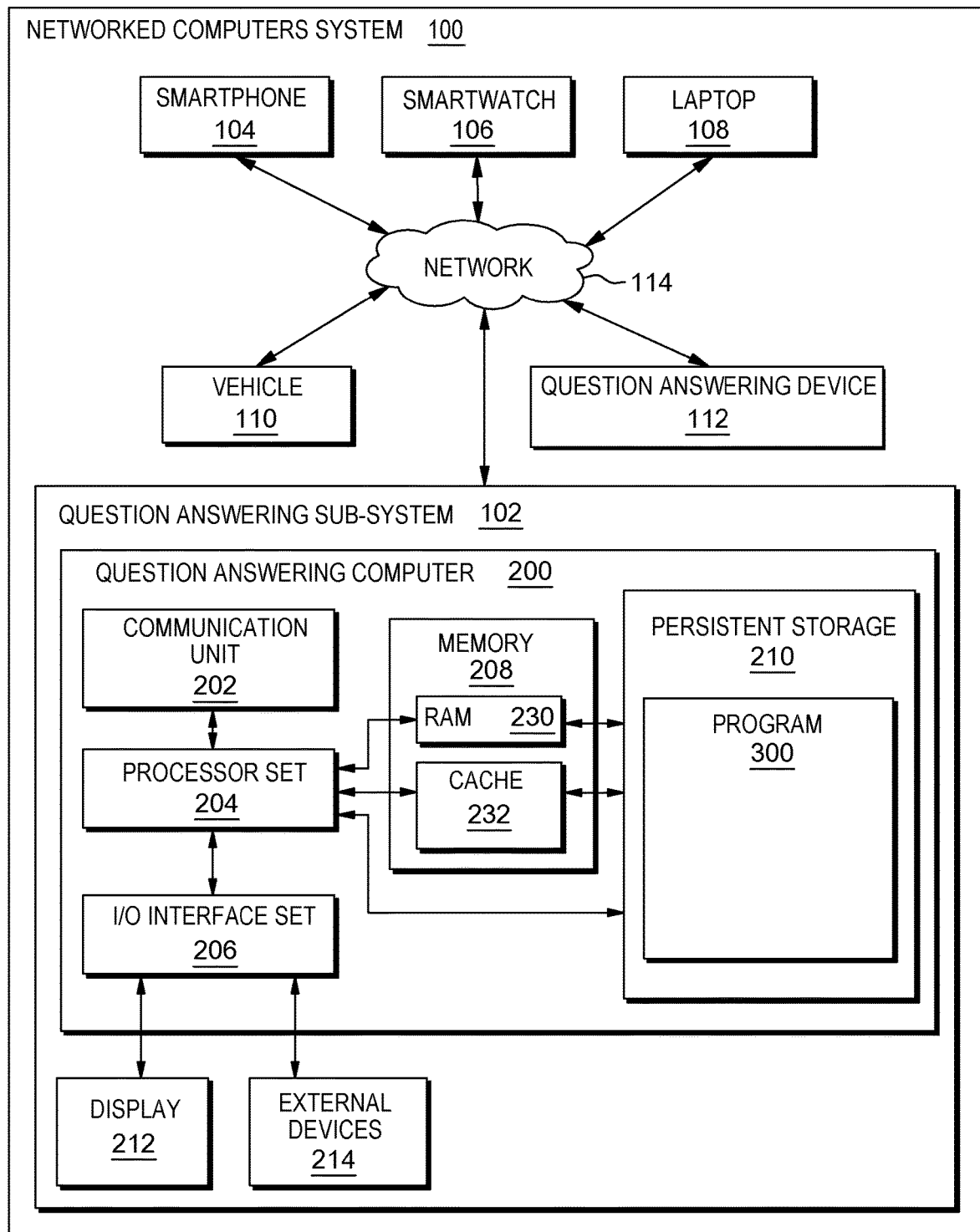
FIG. 1 is a block diagram view of a first embodiment of a system according to the present invention.

One way of evaluating whether a passage is relevant to answer a question in a question answering (QA) system is to calculate term matching scores. However, existing methods for term matching require exact matches (for example, of surface forms) rather than using similarity scores based on vector representations (that is, word embeddings). Embodiments of the present compare vector representations of question terms and passage terms, generating similarity scores for evaluating supporting evidence in QA systems. In some embodiments, the generating of similarity scores is adaptive to a particular QA domain, and in some embodiments the generating of similarity scores is adaptive to a particular QA task. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: question answering (QA) sub-system 102; smartphone 104; smartwatch 106; laptop 108; vehicle 110; question answering device 112; communication network 114; QA computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with QA computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
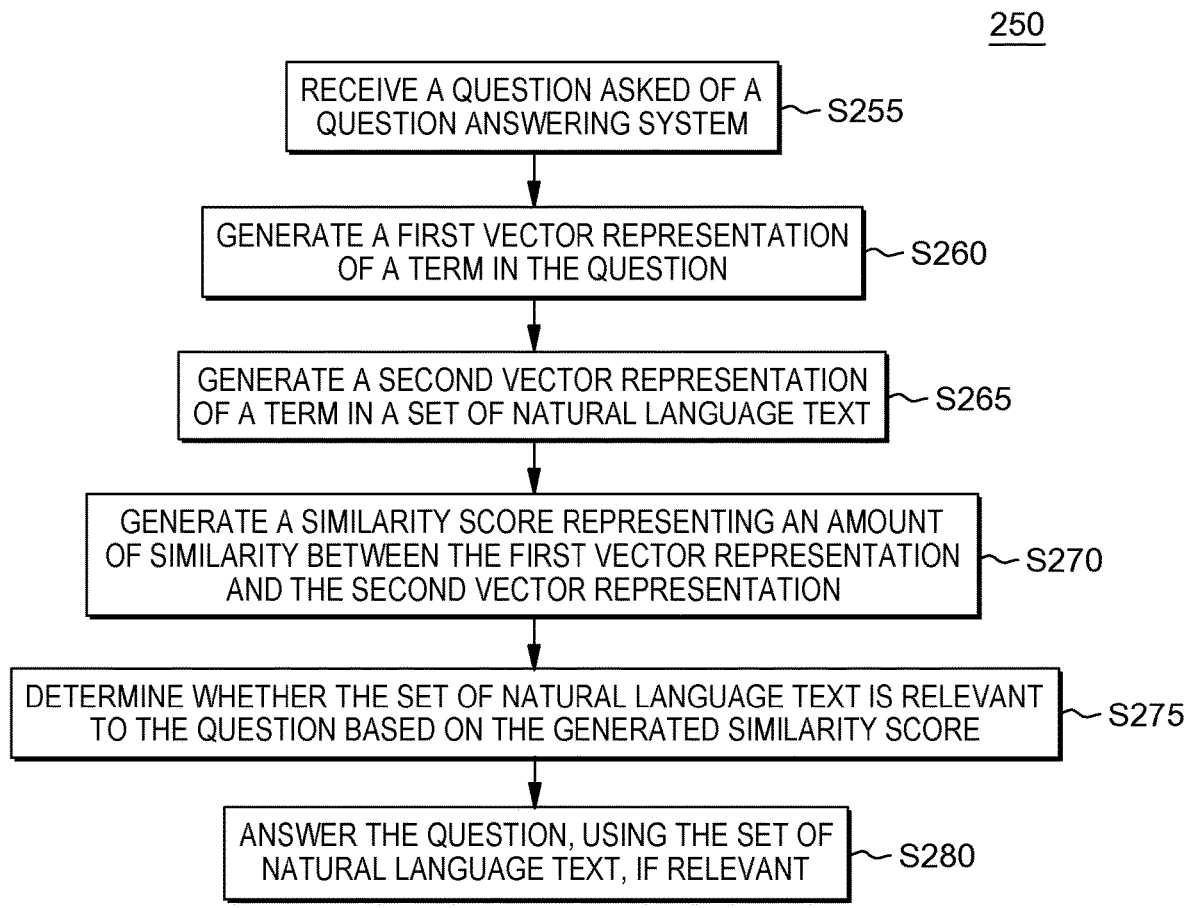
FIG. 2 is a flowchart showing a first embodiment method performed, at least in part, by the first embodiment system.
Figure 3:
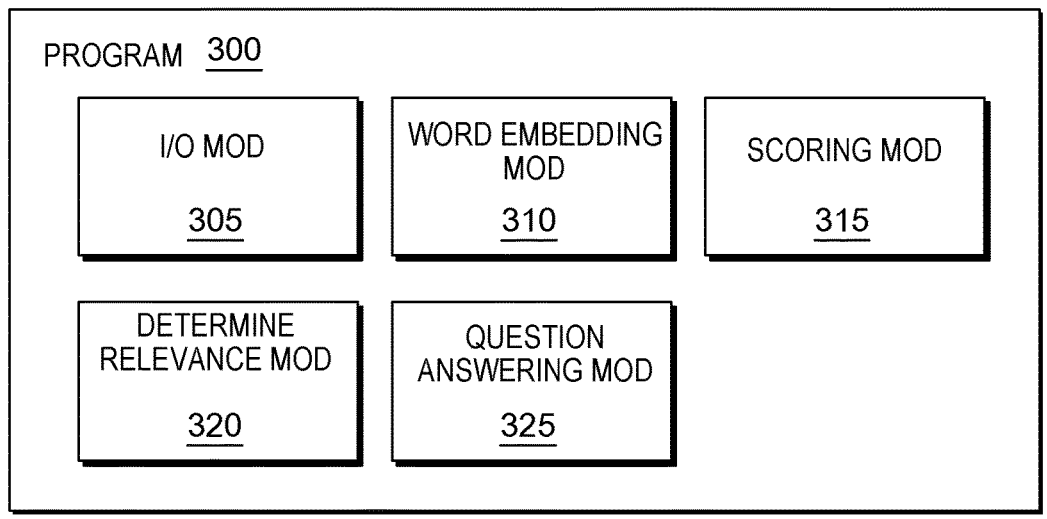
FIG. 3 is a block diagram showing a machine logic (for example, software) portion of the first embodiment system.

FIG. 2 shows flowchart 250 depicting a method (sometimes referred to as method 250) according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

Generally speaking, question answering (QA) systems provide, as output, answers to natural language questions received as input. In many cases, in order to do this, QA systems search known collections of natural language text (sometimes referred to as "passages", or, more simply, as "sets of natural language text") for potential answers to asked questions. QA systems according to the present invention take questions asked by users and compare their terms to terms in known passages, in order to determine whether a given passage is relevant to a given question.

Processing begins at step S255, where I/O module ("mod") 305 receives a question asked of a question answering system (specifically, question answering (QA) sub-system 102) by a user. The question asked of QA sub-system 102 may be received from the user in many of a wide variety of ways including, for example, using a keyboard (physical or virtual) or a microphone of external devices 214 (see FIG. 1). Furthermore, in some embodiments, the question may be asked using any one or more of smartphone 104, smartwatch 106, vehicle 110, laptop 108, and/or dedicated question answering device 112. In the present example embodiment, the question is asked by a user of laptop 108.

Figure 4A:
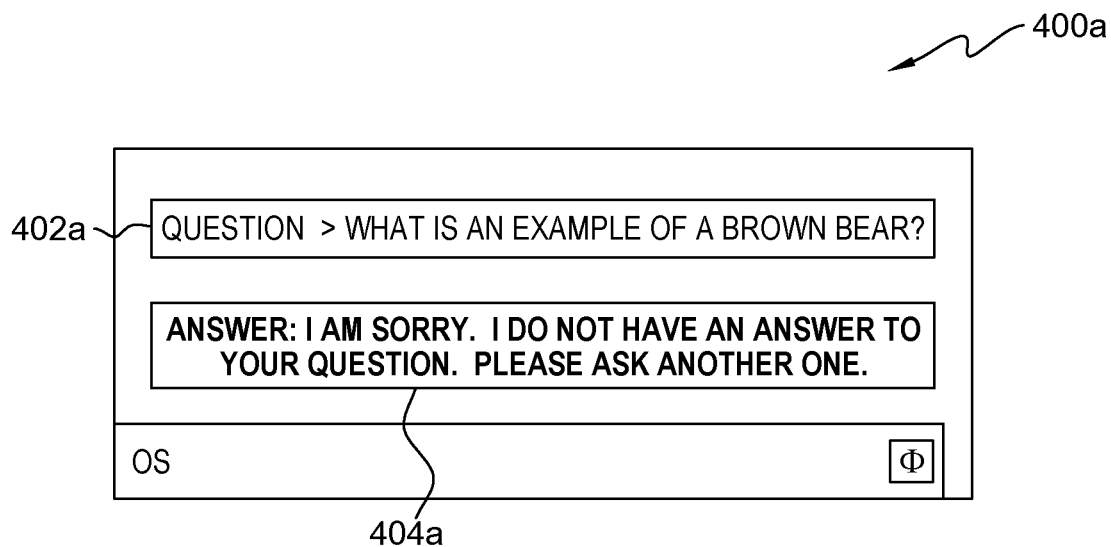
FIG. 4A is a screenshot view generated by the first embodiment system.

Screenshot 400a (see FIG. 4a) depicts a user asking a question according to the present example embodiment. As shown in FIG. 4a, in this embodiment, the user asks the following question (question 402a): "What is an example of a brown bear?"

Processing proceeds to step S260, where word embedding mod 310 generates a first vector representation of a term in the question. The term (which is sometimes also referred to as the "question term") may be any collection of natural language text in the question that, when grouped together as a set, is relevant to matching the question to a potential answer. In many cases, terms correspond to one or more natural language words or phrases. For example, some terms in question 402a could be: "What", "is", "an", "example", "of", "a", "brown", and "bear." In another example, the terms could be "What is an example of" and "a brown bear." However, this is not meant to be limiting. In still other examples, terms could be single letters, numbers, or other characters used by known (or yet to be known) alphabets."

The first vector representation may be any multi-dimensional representation of a term in the question. Many known (or yet to be known) methods for generating vector representations from natural language text may be used. For example, in some embodiments, an artificial neural network, trained to generate vector representations (that is, word embeddings) generates the first vector representation. In other embodiments, for example, the first vector representation is generated using dimensionality reduction on a word co-occurrence matrix. Additionally, the first vector representation may include vectors of varying sizes and complexities. For example, in some embodiments, the first vector representation is a 2-dimension vector. In other embodiments, the first vector representation is a 100-dimension vector. In still other embodiments, even thousands of dimensions (or more) may be used to represent a term in the question in a continuous vector space. In the present example, in step S260, word embedding mod 310 generates a 50-dimension vector for the word "bear" (see question 402a).

Processing proceeds to step S265, where word embedding mod 310 generates a second vector representation of a term in a set of natural language text. As with the previous step, the "term" in this step may be any collection of natural language text that, when grouped together as a set, is relevant to matching the question to a potential answer. However, in this case, the term (sometimes also referred to as the "passage term") is included in a set of natural language text that the QA system is using as a source document (or "passage") for a potential answer. The set of natural language text may be any collection of text that the QA system can utilize for answering questions. In some embodiments, the set of natural language text is a single sentence of text. In other embodiments, the set of natural language text is an entire document. In still other embodiments, the set of natural language text is the entire collection (or a subset) of natural language text available on the World Wide Web.

In the present example embodiment, the set of natural language text is the following sentence (not shown): "The brown squirrel could not bear the cold temperatures." In step S265, word embedding mod 310 generates a second vector representation for the word "bear" in the set. As a result, the first vector representation and the second vector representation both correspond to the same word ("bear"), but the words have different meanings. As such, the vector representations, which are generated based not only on the textual content, but also on contextual characteristics such as syntactic or semantic information, are different—as the first vector representation corresponds to an animal and the second vector representation corresponds to a verb. Furthermore, it should be noted that, as with the first vector representation, word embedding mod 310 may utilize any of a wide variety of known (or yet to be known) word embedding methods for generating the second vector representation, including, but not limited to, the same method that was used for generating the first vector representation.

It should be recognized that the selection of terms in steps S260 and S265 may occur according to a wide variety of possible methods and a wide variety of possible selection criteria. In the present example embodiment, the words "bear" and "bear" were selected based on their similarity. In many cases, terms selected in these steps will be selected for similar reasons. However, this is not meant to be limiting. In certain embodiments, for example, the steps of method 250 may be performed multiple times, in order to generate similarity scores (discussed further, below) for a large number of term pairs. In fact, in some embodiments, the steps of method 250 may be performed for every possible combination of question terms and passage terms.

Processing proceeds to step S270, where scoring mod 315 generates a similarity score representing an amount of similarity between the first vector representation and the second vector representation. The similarity score may be generated in any of a wide variety of ways, a number of which will be discussed in further detail in the following paragraphs. The similarity score may also be represented in a number of different ways, utilizing, for example: (i) integer values (such as a scale of 1 to 100); (ii) percentages (such as 75%); (iii) binary values (such as "terms match" and "terms don't match"); and/or (iv) any other known (or yet to be known) way of representing an amount of similarity between two vectors. In the present example embodiment, the similarity score is a simple value of "no" (that is, the terms don't match). This is based, in part, on the fact that although the words "bear" and "bear" are identical in their spelling, their meanings are very different (and as such, their generated vector representations are not similar).

In certain embodiments of the present invention, the similarity score is generated utilizing unsupervised learning methods. As used herein, an unsupervised learning method is any method that generates a similarity score without using any additional information pertaining to the vectors, their corresponding terms, or the context in which they are being used. Or, stated another way, where supervised learning methods (discussed below) include using labelled data to train a model to a particular QA domain or a particular QA task for which the question term and passage term are being compared, unsupervised learning methods do not use labelled data, and instead use only the vectors themselves. In some embodiments, for example, the unsupervised learning methods include comparing the first vector representation and the second vector representation using one or more similarity functions. For some examples of similarity functions, see the Further Comments and/or Embodiments subsection of this Detailed Description.

In certain embodiments of the present invention, the similarity score is generated utilizing supervised learning methods. As stated above, a supervised learning method according to the present invention is any method for generating similarity scores that utilizes additional information pertaining to the vectors, their corresponding terms, or the context in which the vectors/terms are being compared. Stated another way, supervised learning methods use labelled data (such as confirmed positive matches of terms and/or confirmed negative matches of terms) to train a model to a particular QA domain or a particular QA task. For example, in certain embodiments, the supervised learning methods include utilizing an artificial neural network trained according to a certain amount of known information. In some of these embodiments, the artificial neural network is trained using question and answer ground truths adapted for a specific domain. In these embodiments, by using known questions and answers (or question terms and known matching passage terms) relating to a specific domain (or subject matter area), the artificial neural network can be trained to better determine similarity according to that domain. In other embodiments, the artificial neural network is trained using question and answer ground truths adapted for specific question answering tasks. In these embodiments, by using known questions and answers (or question terms and known matching passage terms) relating to a specific question answering task, the artificial neural network can be trained to better determine similarity according to that specific task. Some examples of specific question answering tasks include, but are not limited to: customer service tasks, call center tasks, and/or weather service tasks. For further discussion of artificial neural networks and their training, see the Further Comments and/or Embodiments sub-section of this Detailed Description. It should further be noted that although many embodiments of the present invention utilize artificial neural networks for generating similarity scores, many other known (or yet to be known) supervised learning methods may be used to generate similarity scores in this step.

Processing proceeds to step S275, where determine relevance mod 320 determines whether the set of natural language text is relevant to the question based, at least in part, on the generated similarity score. In the present example embodiment, because the generated similarity score indicates that the first vector representation and the second vector representation are not similar, determine relevance mod 320 determines that the passage is not relevant to the question (or, more particularly, not relevant to answering the question). In other embodiments, however, the determination of relevancy may be different, and many times, more complex. The determination of relevancy may utilize a wide variety of known (or yet to be known) methods, and may be based on a wide variety of factors. Also, although a general rule is that the stronger the similarity between the terms, the more likely that the set of natural language text is relevant, in some embodiments the opposite may be true. Furthermore, in some embodiments the determination of relevancy may be based on more than one similarity score generated for more than one pair of terms, in order to fully consider all of the information included in both the question and the passage.

Processing proceeds to step S280, where question answering mod 325 answers the question asked in step S255. In situations where the set of natural language text has been determined to be relevant to the question, question answering mod 325 may use the set of natural language text to answer the question. In the present example embodiment, however, the terms have been determined to not be relevant. In this case, question answering mod 325 may do one of a number of things. In some embodiments, question answering mod 325 may search for additional passage terms and provide additional comparisons of question terms and passage terms, in order to help find a suitable answer to the question. In other embodiments, including the present example embodiment, question answering mod 325 determines that it does not know the answer to the question. Answer 404a (see FIG. 4A) shows an example of an answer provided by question answering mod 325 according to the present example. As shown in FIG. 4A, because question answering mod 325 does not know the answer to the question, the following text is output to the user using I/O mod 305: "I am sorry. I do not have an answer to your question. Please ask another one."

Figure 4B:
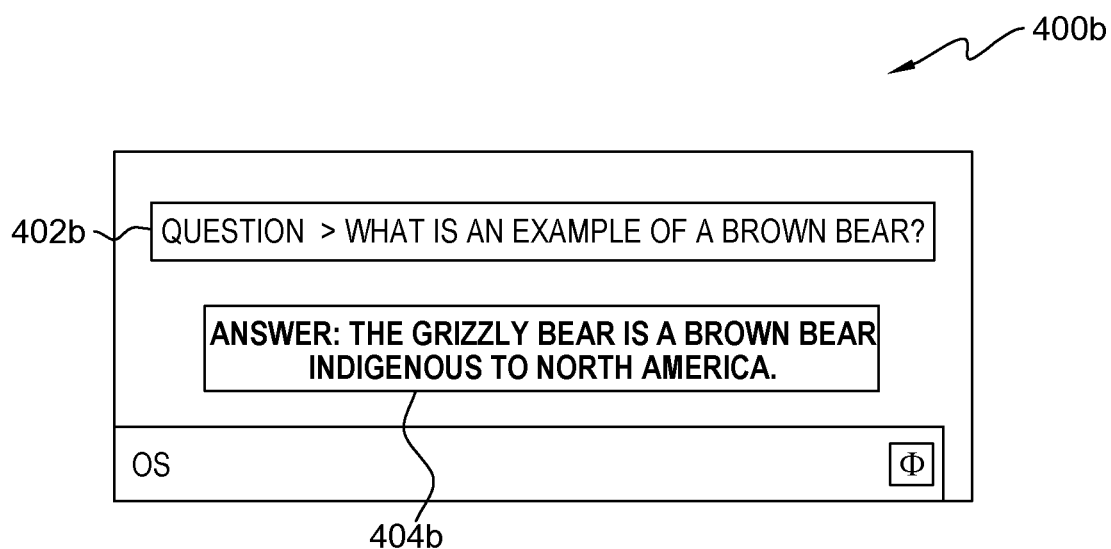
FIG. 4B is a screenshot view generated by the first embodiment system.

As stated above, in situations where the set of natural language text has been determined to be relevant to the question, question answering mod 325 may use the set of natural language text to answer the question. Screenshot 400b (see FIG. 4B) shows an example of a situation where program 300 has determined that a set of natural language text is relevant to the question. More specifically, in the example shown in screenshot 400b, the question (that is, question 402b) asked of the question answering system is the same question asked by the user in in screenshot 400a. However, in this case, the set of natural language text is as follows: "The grizzly bear is a brown bear indigenous to North America." This time, when comparing the vector representations for the term "bear" in the question and the term "bear" in the passage, scoring mod 315 determines that the words are, in fact, similar. As such, determine relevance mod 320 determines that the passage is relevant to the question, and question answering mod 325 answers the question using the passage (as shown in answer 404b).

III. Further Comments and/or Embodiments

Some embodiments of the present invention recognize the following facts, potential problems and/or potential areas for improvement with respect to the current state of the art: (i) existing methods require exact matches (for example, surface forms) of question terms and passage terms; and/or (ii) existing methods do not catch hidden information (such as contextual information) or use hidden information in the calculating of similarity scores.

Some embodiments of the present invention may include one, or more, of the following features, characteristics and/or advantages: (i) performing term matching using similarity scores based on vector representations (that is, word embeddings); (ii) using similarity scores from vector representations as one of the scores for evaluating supporting evidence in a question answering system; (iii) combining similarity scores with other features in a machine learning based QA framework; (iv) providing methods for generating similarity scores that are adaptive to a particular QA domain; and/or (v) providing methods for generating similarity scores that are adaptive to a particular QA task.

Embodiments of the present invention propose a new method for term matching in question answering. Generally speaking, a term match scorer for QA systems is used to compute similarity scores between question terms and passage terms (that is, terms in potential answer passages). While existing methods of term matching are based on surface forms of words, embodiments of the present invention can determine similarity based on hidden information (such as contextual information). For example, these embodiments are adapted to match similar terms such as synonyms, hyponyms, and/or related types.

Some embodiments of the present invention apply word embedding in term matching for question answering by computing a similarity of word and/or phrase pairs based on word embedding from unsupervised or supervised training in deep learning.

Figure 5A:
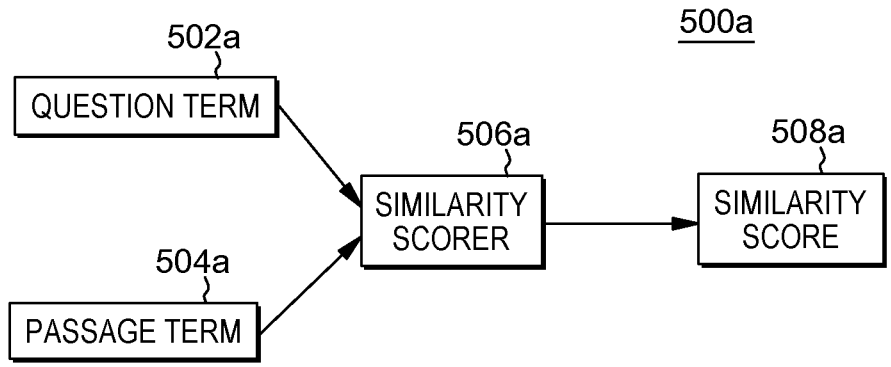
FIG. 5A is a block diagram showing information that is helpful in understanding the application of distributed representations in term matching for question answering systems according to embodiments of the present invention.

Certain embodiments of the present invention include a system for applying distributed representations (that is, word vectors/embeddings) in term matching for question answering systems. Diagram 500a (see FIG. 5A) shows an example that is helpful in understanding these systems. Specifically, in this example, question term 502a and passage term 504a are provided to similarity scorer 506a as input. Similarity scorer 506a then uses question term 502a and passage term 504a to generate similarity score 508a as output. Similarity scorer 506a generates word embeddings for both question term 502a and passage term 504a in order to use those word embeddings to calculate a similarity score.

In many embodiments, question term 502a and/or passage term 504a include additional contextual information to assist similarity scorer 506a in its similarity scoring. The contextual information may include any of a wide variety of information pertaining to question term 502a and/or passage term 504a. For example, in some embodiments, the contextual information may include syntactic information, such as part-of-speech information. In other (or the same) embodiments, the contextual information may include semantic information, such as named entity type information or any other information relating to the meaning of the particular question term 502a or passage term 504a.

Figure 5B:
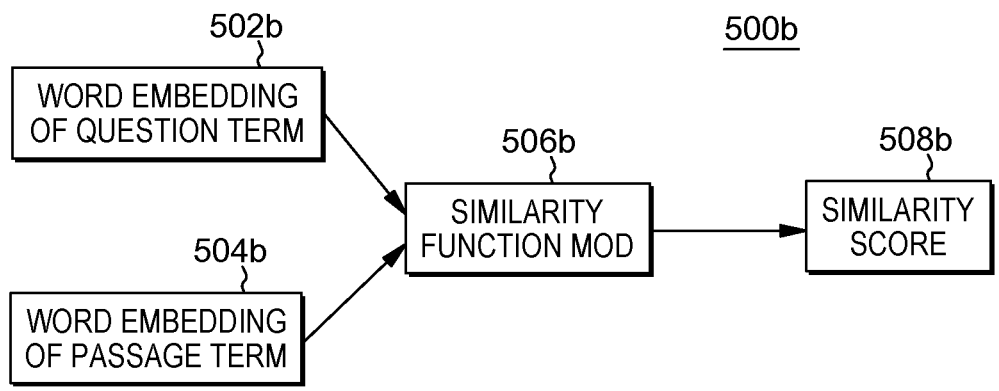
FIG. 5B is a block diagram view of a second embodiment system according to the present invention.

Certain embodiments of the present invention include a system and method to compute a similarity of word or phrase pairs based on word embeddings generated from unsupervised learning methods. Diagram 500b (see FIG. 5B) shows an example of a system (sometimes referred to as a "second embodiment system") according to one of these embodiments. As shown in FIG. 5B, word embedding of question term 502b and word embedding of passage term 504b are received by similarity function mod 506b. Similarity function mod 506b uses similarity functions to calculate similarity score 508b for question term 502b and passage term 504b. Some examples of similarity functions include, but are not limited to: (i) cosine similarity; and/or (ii) Euclidean distance. It should be noted that the similarity functions utilized by similarity function mod 506b generate similarity scores simply based on word embeddings 502b and 504b. That is, once word embeddings are generated for the question term and the answer term, similarity function mod 506b is able to generate a similarity score without any kind of supervised learning. Instead, similarity function mod 506b simply compares the two vectors (that is, the word embeddings) using known (or yet to be known) vector comparison functions.

Figure 5C:
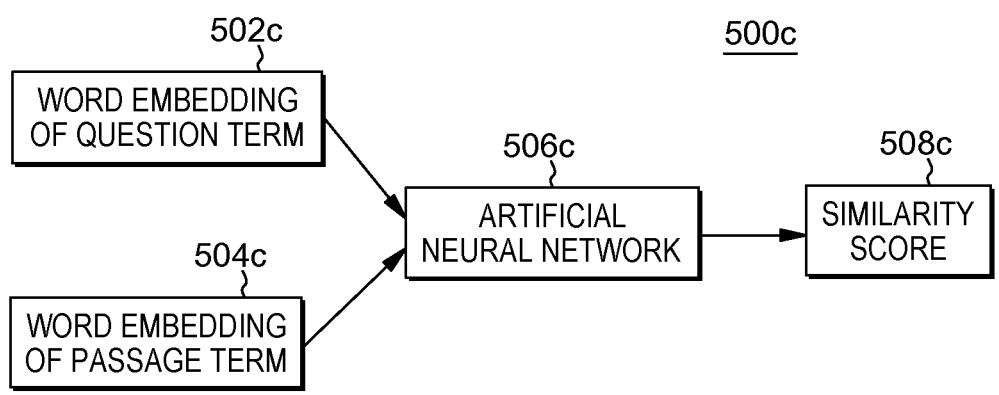
FIG. 5C is a block diagram view of a third embodiment system according to the present invention.

Certain embodiments of the present invention include a system and method to compute a similarity of word or phrase pairs based on supervised deep learning. Diagram 500c (see FIG. 5C) shows an example of a system (sometimes referred to as a "third embodiment system") according to one of these embodiments. As shown in diagram 500c, word embedding of question term 502c and word embedding of passage term 504c are received by artificial neural network 506c. Artificial neural network 506c then generates a similarity score 508c based on the received word embeddings. Artificial neural network 506c may be configured and operated in wide variety of ways, some of which will be discussed in the following paragraphs.

Figure 6:
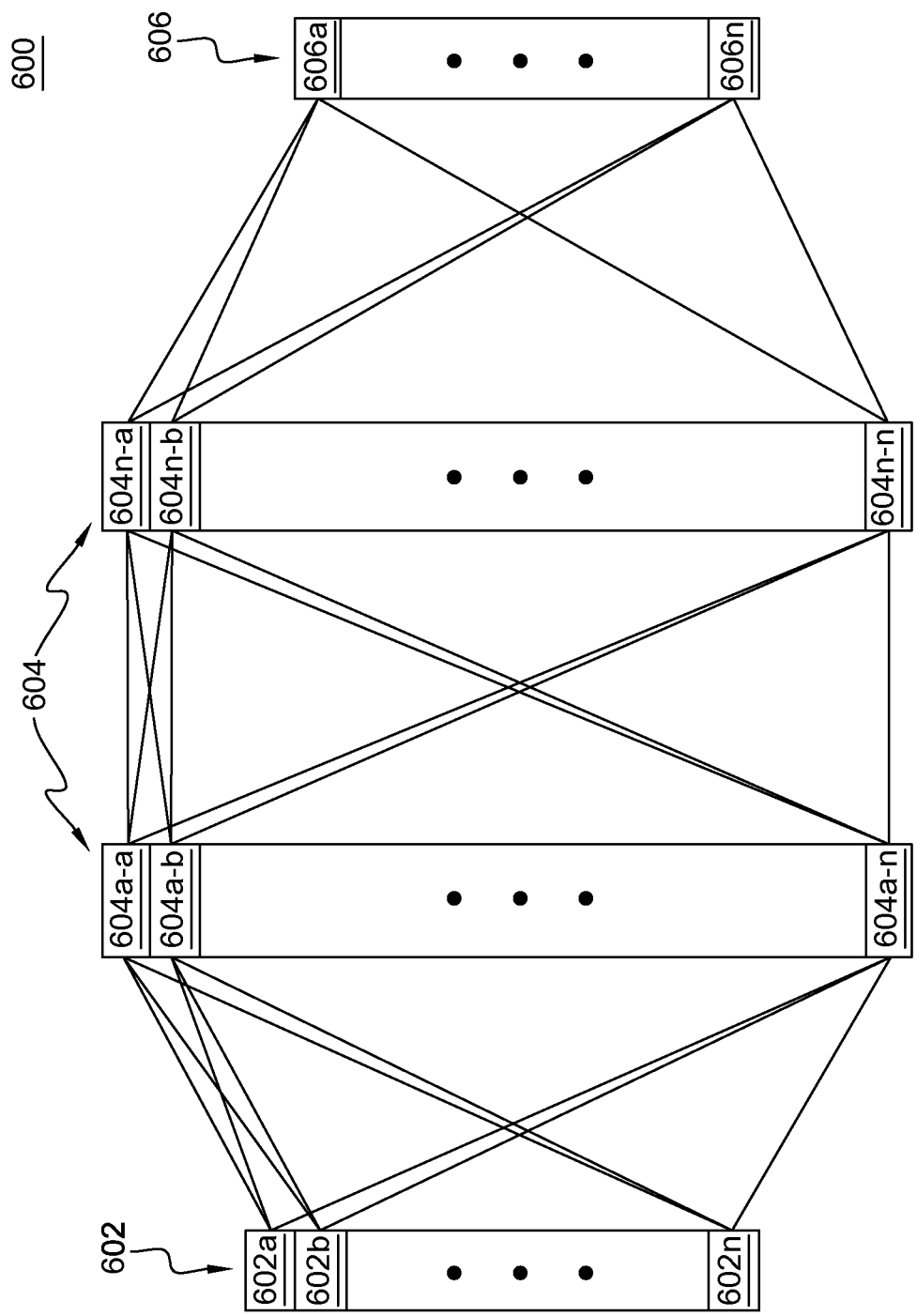
FIG. 6 is a neural network diagram depicting an artificial neural network according to the third embodiment system.

Diagram 600 (see FIG. 6) is a neural network diagram depicting an artificial neural network according to the third embodiment system (such as artificial neural network 506c). As shown in FIG. 6, the neural network includes input layer 602, output layer 606, and hidden layers 604. In this embodiment, there may be between zero and "n" hidden layers, where "n" is a real number greater than or equal to one. Input layer 602, output layer 606, and each hidden layer 604 include a plurality of nodes (or "neurons"), designated as 602a through 602n for input layer 602, 606a through 606n for output layer 606, 604a-a through 604a-n for the first hidden layer 604, and 604n-a through 604n-n for the last hidden layer 604. The laywise connections in the neural network may be all-connected (such that each neuron in one layer connects to each neuron in the immediately preceding layer and each neuron in the immediately subsequent layer, as depicted in FIG. 6) or partially-connected. Furthermore, in some embodiments, the neural network is a convolutional neural network and includes convolutional neural network-type layers.

In the embodiment depicted in FIG. 6, the artificial neural network receives two word embeddings as input at input layer 602: (i) a word embedding corresponding to a question term (received, for example, at node 602a); and (ii) a word embedding corresponding to a passage term (received, for example, at node 602b). When the artificial neural network receives these two inputs, it uses hidden layers 604 to produce an output in output layer 606. In many embodiments, the output produced in output layer 606 includes posterior probabilities of binary classification. That is, in these embodiments, the output includes a probability that the inputs fit into a first class (such as "terms match) and a probability that the inputs fit into a second class (such as "terms don't match). These probabilities can then be used to assist a question answering system in performing its machine learning based term matching.

It should be noted that in other embodiments, the inputs and outputs received/generated by an artificial neural network may be different than those discussed above in relation to FIG. 6. For example, in some embodiments, the inputs received at input layer 602 may include the original question term and passage term to be compared (prior to any generation of word embeddings). Or, in other embodiments, the inputs may include word embeddings of multiple question terms and/or multiple passage terms, in order to produce a similarity score that is based on more than two inputs. Similarly, the outputs produced at output layer 606 may include other variations of similarity scores (that is, similarity scores that are not expressed as posterior probabilities of binary classification), such as, for example, a single integer store and/or a plurality of similarity related metrics. In still another embodiment, two 100-dimension input vectors are received at input layer 602. In this embodiment, each dimension of each input is received a different input node (for a total of 200 input nodes), and output layer 606 includes two output nodes: one representing pairs that are similar and one representing pair that are not similar. However, none these examples are meant to be limiting, and artificial neural networks may be used in any known (or yet to be known) way to generate similarity scores for use in term matching by QA systems.

Artificial neural networks according to the present invention may be trained in any of a wide variety of ways. In certain embodiments, question-answer ground truths are used to adapt the artificial neural network for a particular domain. In these embodiments, for example, the question-answer ground truths (for example, known posterior probabilities of binary classification for a single question term and passage term) may be received by output layer 606 in order to train the neural network using backpropagation, stochastic gradient descent, or other known (or yet to be known) methods. In many embodiments, word/phrase vectors and network parameters are further optimized during training.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Natural Language: any language used by human beings to communicate with each other.

Natural Language Processing: any derivation of meaning from natural language performed by a computer.

Question Answering System: any computer system capable of answering a question posed in natural language.

What is claimed is:

1. A computer-implemented method comprising:
receiving, by a question answering (QA) system, an input question asked by a user, wherein the QA system is a computer system configured to answer input questions utilizing a plurality of source documents;
generating, by the QA system, a plurality of vectors including a first vector representation of an input question term of a set of ordered input question terms in the input question and a second vector representation of a source document term of a set of ordered source document terms in a source document of the plurality of source documents, wherein the first vector representation and the second vector representation are generated by combining respective pluralities of dimensions for the first vector representation and the second vector representation to form multi-dimension vectors, wherein the first vector representation is based at least in part on the set of ordered input question terms and the second vector representation is based at least in part on the set of ordered source document terms;
determining, by the QA system, a similarity score for the input question term and the source document term based at least in part on each dimension of each of the first vector representation and the second vector representation as input into a respective input node of an artificial neural network;
determining, by the QA system, whether the source document is relevant to answering the input question based, at least in part, on: (i) an output generated by the artificial neural network based on the input question, wherein the output comprises the similarity score, and (ii) additional outputs generated by the artificial neural network based on additional inputs, the additional inputs including respective dimensions of respective vector representations for respective input question terms and source document terms, wherein the output and the additional outputs comprise similarity scores for every combination of input question terms in the ordered set of input question terms and source document terms in the ordered set of source document terms; and
in response to determining that the source document is relevant to answering the input question, generating, by the QA system, an answer to the input question utilizing the source document.

2. The method of claim 1, further comprising training, by the QA system, the artificial neural network, wherein training the artificial neural network comprises: (i) providing, at respective input nodes of an input layer of the artificial neural network, vector dimensions of a set of ground truth vector representations corresponding to ground truth question/answer pairs, (ii) providing, at a first output node of an output layer of the artificial neural network, first pairs of vector dimensions of the set of ground truth vector representations that are similar, (iii) providing, at a second output node of the output layer of the artificial neural network, second pairs of vector dimensions of the set of ground truth vector representations that are not similar, and (iv) training the artificial neural network using backpropagation.

3. The method of claim 1, wherein the determining of whether the source document is relevant to answering the input question is further based, in part, on one or more unsupervised learning methods.

4. The method of claim 3, wherein the one or more unsupervised learning methods include comparing the first vector representation and the second vector representation using a similarity function.

5. The method of claim 4, wherein the similarity function is at least one of a cosine similarity function and a Euclidean distance function.

6. The method of claim 1, wherein the respective pluralities of dimensions for the first vector representation and the second vector representation are determined using dimensionality reduction on a word co-occurrence matrix.

7. The method of claim 1, further comprising providing, by the QA system, the answer to the user.

8. The method of claim 1, wherein the artificial neural network is trained to determine probabilities that pairs of vector dimensions are similar and probabilities that pairs of vector dimensions are not similar.

9. A computer program product comprising a computer readable storage medium having stored thereon:
program instructions to receive, by a question answering (QA) system, an input question asked by a user, wherein the QA system is a computer system configured to answer input questions utilizing a plurality of source documents;
program instructions to generate, by the QA system, a plurality of vectors including a first vector representation of an input question term of a set of ordered input question terms in the input question and a second vector representation of a source document term of a set of ordered source document terms in a source document of the plurality of source documents, wherein the first vector representation and the second vector representation are generated by combining respective pluralities of dimensions for the first vector representation and the second vector representation to form multi-dimension vectors, wherein the first vector representation is based at least in part on the ordered input question terms and the second vector representation is based at least in part on the ordered source document terms;
program instructions to determine, by the QA system, a similarity score for the input question term and the source document term based at least in part on each dimension of each of the first vector representation and the second vector representation as input into a respective input node of an artificial neural network;
program instructions to determine, by the QA system, whether the source document is relevant to answering the input question based, at least in part, on: (i) an output generated by the artificial neural network based on the input question, wherein the output comprises the similarity score, and (ii) additional outputs generated by the artificial neural network based on additional inputs, the additional inputs including respective dimensions of respective vector representations for respective input question terms and source document terms, wherein the output and the additional outputs comprise similarity scores for every combination of input question terms in the ordered set of input question terms and source document terms in the ordered set of source document terms; and
program instructions to, in response to determining that the source document is relevant to answering the input question, generate, by the QA system, an answer to the input question utilizing the source document.

10. The computer program product of claim 9, the computer readable storage medium having further stored thereon program instructions to train, by the QA system, the artificial neural network, wherein training the artificial neural network comprises: (i) providing, at respective input nodes of an input layer of the artificial neural network, vector dimensions of a set of ground truth vector representations corresponding to ground truth question/answer pairs, (ii) providing, at a first output node of an output layer of the artificial neural network, first pairs of vector dimensions of the set of ground truth vector representations that are similar, (iii) providing, at a second output node of the output layer of the artificial neural network, second pairs of vector dimensions of the set of ground truth vector representations that are not similar, and (iv) training the artificial neural network using backpropagation.

11. The computer program product of claim 9, wherein the determining of whether the source document is relevant to answering the input question is further based, in part, on one or more unsupervised learning methods.

12. The computer program product of claim 11, wherein the one or more unsupervised learning methods include comparing the first vector representation and the second vector representation using a similarity function.

13. The computer program product of claim 12, wherein the similarity function is at least one of a cosine similarity function and a Euclidean distance function.

14. The computer program product of claim 9, wherein the respective pluralities of dimensions for the first vector representation and the second vector representation are determined using dimensionality reduction on a word co-occurrence matrix.

15. The computer program product of claim 9, the computer readable storage medium having further stored thereon program instructions to provide, by the QA system, the answer to the user.

16. A question answering (QA) system configured to answer input questions utilizing a plurality of source documents, the QA system comprising:
one or more processors; and
a computer readable storage medium;
wherein:
the one or more processors are structured, located, connected and/or programmed to run program instructions stored on the computer readable storage medium; and
the program instructions include:
first program instructions to receive, by the QA system, an input question asked by a user;
second program instructions to generate, by the QA system, a plurality of vectors including a first vector representation of an input question term of a set of ordered input question terms in the input question and a second vector representation of a source document term of a set of ordered source document terms in a source document of the plurality of source documents, wherein the first vector representation and the second vector representation are generated by combining respective pluralities of dimensions for the first vector representation and the second vector representation to form multi-dimension vectors, wherein the first vector representation is based at least in part on the ordered input question terms and the second vector representation is based at least in part on the ordered source document terms;
third program instructions to determine, by the QA system, a similarity score for the input question term and the source document term based at least in part on each dimension of each of the first vector representation and the second vector representation as input into a respective input node of an artificial neural network;
fourth program instructions to determine, by the QA system, whether the source document is relevant to answering the input question based, at least in part, on: (i) an output generated by the artificial neural network based on the input question, wherein the output comprises the similarity score, and (ii) additional outputs generated by the artificial neural network based on additional inputs, the additional inputs including respective dimensions of respective vector representations for respective input question terms and source document terms, wherein the output and the additional outputs comprise similarity scores for every combination of input question terms in the ordered set of input question terms and source document terms in the ordered set of source document terms; and fifth program instructions to, in response to determining that the source document is relevant to answering the input question, generate, by the QA system, an answer to the input question utilizing the source document.

17. The QA system of claim 16, the stored program instructions further including sixth program instructions to train, by the QA system, the artificial neural network, wherein training the artificial neural network comprises: (i) providing, at respective input nodes of an input layer of the artificial neural network, vector dimensions of a set of ground truth vector representations corresponding to ground truth question/answer pairs, (ii) providing, at a first output node of an output layer of the artificial neural network, first pairs of vector dimensions of the set of ground truth vector representations that are similar, (iii) providing, at a second output node of the output layer of the artificial neural network, second pairs of vector dimensions of the set of ground truth vector representations that are not similar, and (iv) training the artificial neural network using backpropagation.

18. The QA system of claim 16, wherein the determining of whether the source document is relevant to answering the input question is further based, in part, on one or more unsupervised learning methods.

19. The QA system of claim 18, wherein the one or more unsupervised learning methods include comparing the first vector representation and the second vector representation using a similarity function.

20. The QA system of claim 16, wherein the respective pluralities of dimensions for the first vector representation and the second vector representation are determined using dimensionality reduction on a word co-occurrence matrix.

21. The QA system of claim 16, the program instructions further including seventh program instructions to provide, by the QA system, the answer to the user.

* * * * *

UNITED STATES PATENT AND TRADEMARK OFFICE
CERTIFICATE OF CORRECTION

| | |
|---|---|
| PATENT NO. | : 11,288,295 B2 |
| APPLICATION NO. | : 16/546770 |
| DATED | : March 29, 2022 |
| INVENTOR(S) | : James J. Fan et al. |

It is certified that error appears in the above-identified patent and that said Letters Patent is hereby corrected as shown below:

On the Title Page

Item (71), applicant 1, address, after "Road Town", insert --, Tortola--.
Item (73), assignee, address, insert --Road Town, Tortola (VG)--.
In page 2, Column 2, item (56), other publications, cite no. 2, delete "Ebret" and insert --Lebret--, therefor.

Signed and Sealed this
First Day of November, 2022

Katherine Kelly Vidal
*Director of the United States Patent and Trademark Office*